Jan. 3, 1950 K. A. LUNDKVIST 2,493,256

MULTIEXCHANGE TELEPHONE SYSTEM

Filed Jan. 31, 1944 4 Sheets-Sheet 1

INVENTOR
K. A. LUNDKVIST
BY Seascrvitz, Downing & Seebold
ATTYS

Jan. 3, 1950 K. A. LUNDKVIST 2,493,256

MULTIEXCHANGE TELEPHONE SYSTEM

Filed Jan. 31, 1944 4 Sheets-Sheet 2

INVENTOR
K. A. LUNDKVIST
BY Glascock Downing & Seebold
ATTYS.

Jan. 3, 1950 K. A. LUNDKVIST 2,493,256

MULTIEXCHANGE TELEPHONE SYSTEM

Filed Jan. 31, 1944 4 Sheets-Sheet 3

INVENTOR
K. A. LUNDKVIST
BY Glascock, Downing & Seebold
ATTYS.

MULTIEXCHANGE TELEPHONE SYSTEM

Filed Jan. 31, 1944 4 Sheets-Sheet 4

INVENTOR
K. A. LUNDKVIST
BY Glascock, Downing & Seebold
ATTYS

Patented Jan. 3, 1950 2,493,256

UNITED STATES PATENT OFFICE 2,493,256

MULTIEXCHANGE TELEPHONE SYSTEM

Karl Axel Lundkvist, Stockholm, Sweden, assignor to Telefonaktiebolaget L M Ericsson, Stockholm, Sweden, a company of Sweden Application January 31, 1944, Serial No. 520,502
In Sweden January 22, 1943

2 Claims. (Cl. 179—18)

Figure 1:
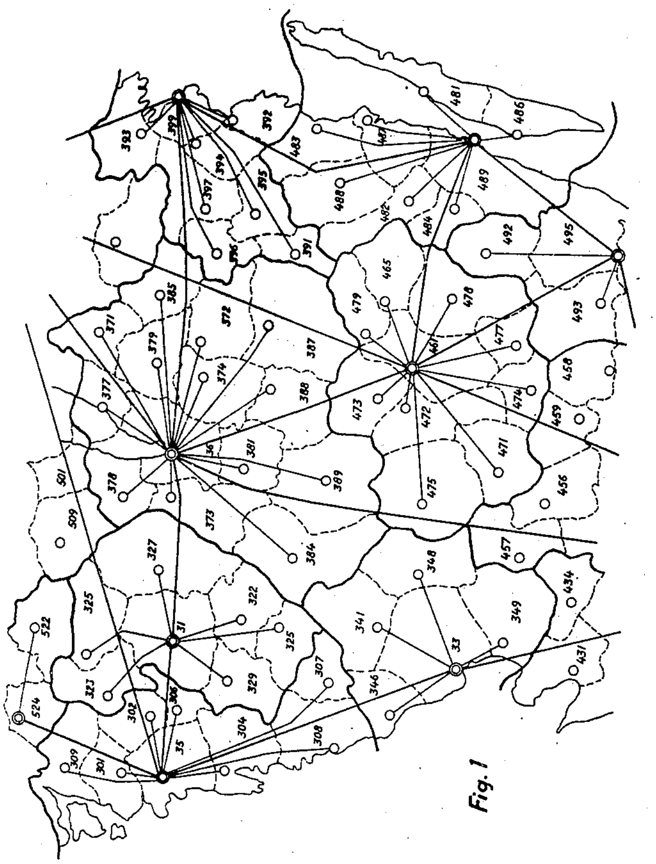

The present invention relates to devices for automatic setting-up of trunk connections. Such telephone connections will pass a number of junction centres and require for their setting, besides the local telephone number of the called subscriber, a trunk number which indicates to which local telephone network the called subscriber is connected. As a rule, the local networks have star structure and each digit in the local telephone number of the subscriber definitely indicates a traffic direction. This is not the case in a trunk network. It happens frequently that a trunk traffic route cannot be determined with less than two digits following one upon the other in the trunk telephone number. Besides there is frequently the possibility of reaching the called exchange over more traffic routes than one and, should all the lines in one route be engaged, it is desirable that the connection is set up over some other traffic route, over which the called exchange can be reached.

It is known to set up trunk connections by means of trunk registers which change the trunk number of the called local network into a number adapted to the switching operation in which number each digit definitely indicates a traffic route. This method, however, entails extremely complicated register devices and every exchange of the trunk network has to be provided with special registers adapted to the connections emanating from this exchange. Moreover, the number of different routing possibilities to be controlled by every register becomes very great. The most serious drawback of the said method is that all traffic channels from the beginning must be predetermined and a re-routing of the traffic channels would necessitate changes in all the trunk registers.

It is known also to send the trunk number of the called local network from exchange to exchange and in every exchange, to arrange registers which receive the trunk number and route the selectors connected to the trunk lines to a traffic route corresponding to the trunk number. This method is devoid of the drawbacks of the previous method but instead entails another great disadvantage, namely, that the switching operation requires more time if composed of many digits number is to be repeated several times.

The present invention has for its object to eliminate the disadvantage of the last-mentioned method and attains this by transferring the digit combination in a register in a telephone exchange to a register in another telephone exchange by means of impulse series which correspond to the digits indicated by the digit combination, in such a manner that two or more digits are transferred simultaneously and by means of A. C. impulses with various A. C. frequencies whereby each A. C. frequency indicates a position in the digit combination, and the number of impulses having identical A. C. frequency indicates the value of the digit which takes the place indicated by the A. C. frequency. In order further to shorten the switching operation the register devices are connected to junction lines, by means of relay selectors of known construction, so-called cross-bar selectors, in which the switching operation is initiated by an electromagnet connected in series to a discharge tube which magnet is actuated when the discharge tube is lit whereby said tube is lit in series with a resistance common to a group of register devices. This arrangement enables the connection of a register device to take place extremely fast, as is seen from the description below.

Figure 2:
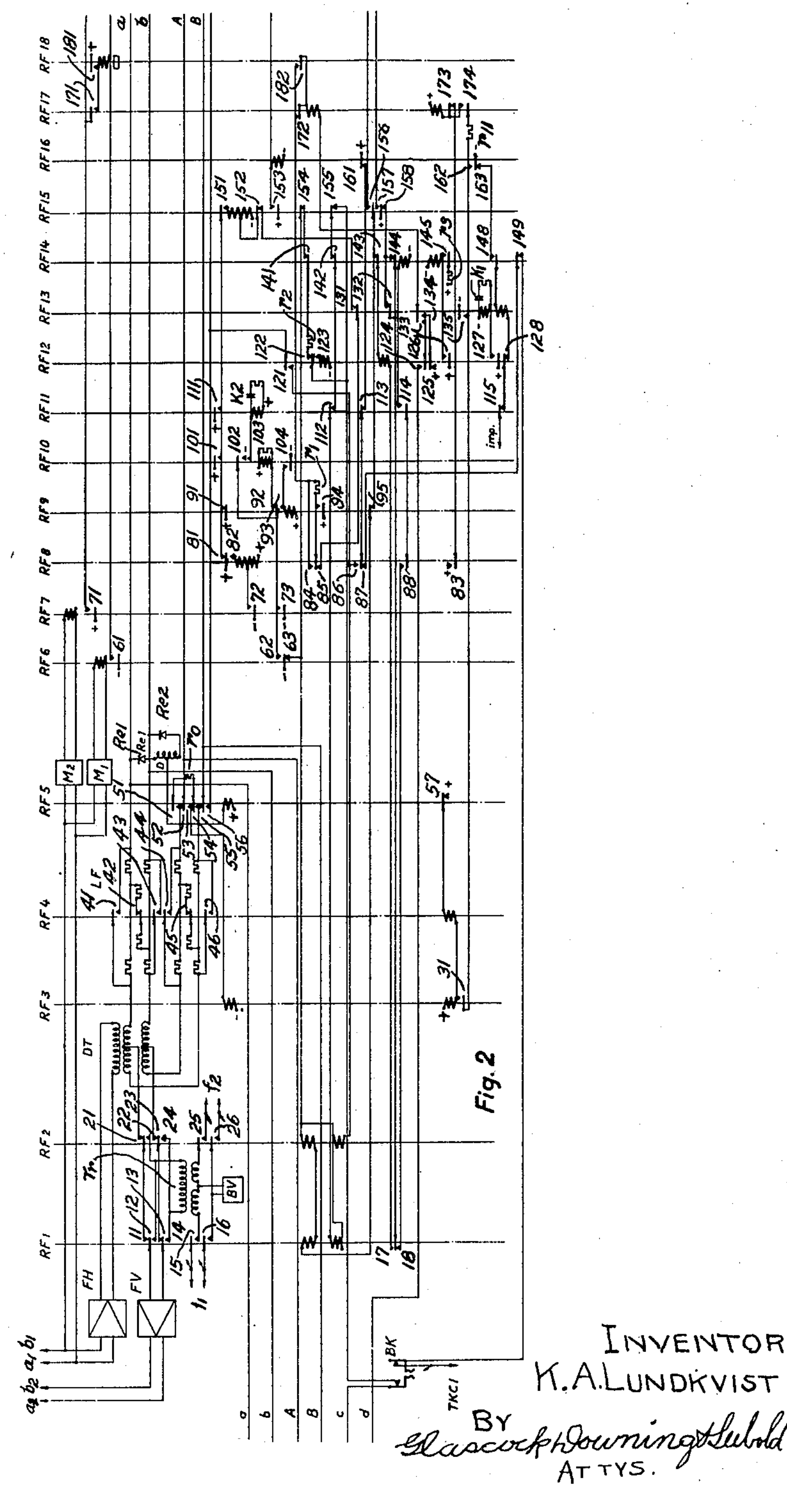

In the same manner the group selectors connected to the trunk lines, which also consist of cross-bar selectors, are arranged and set from the register devices, whereby the switching operation is initiated by two electro-magnets connected in series, one of which belongs to the register device and the other to the group selector, and the said two electro-magnets are actuated in series with a discharge tube which is lit in series with a resistance common to a group of group selectors and register. The setting of a group selector takes place very rapidly with this arrangement which below will be described in detail in connection with the accompanying drawing in which, Fig. 1 illustrates a number of trunk exchanges and the trunk network connecting these. Fig. 2 shows the line equipment for a trunk line and Fig. 3 the group selector CV belonging to the same line. Fig. 4 follows Fig. 3 over the connections extending downwardly from the latter figure and shows a register REG and its line finder RS which temporarily connects the register REG to the group selector GV. Fig. 1 shows how it is possible to a certain extent, to give the trunk network a star structure around certain big centres for instance in the junction centre 36 which is centre for all the exchanges 371—379 and 381—389. However, it is necessary to draw some direct lines between these centres in order to avoid too long and expensive detours. The numbering for the trunk exchanges is 3-digit but with the star-formed grouping around large centres according to Fig. 1, the last digit will indicate definitely a traffic routing, thus only the two first digits need be registered and sent from exchange to exchange.

The trunk line is in Fig. 2 represented as a 4-wire line with the line branches $a_1b_1$ and $a_2b_2$ but the diagram applies also to a 2-wire line if this in known manner is split with the aid of a differential transformer and a line balance into arriving and departing branches which correspond to the wires $a_1b_1$ and $a_2b_2$. A calling signal from the line arrives in the lines $a_1b_1$ and actuates the signal receiver $M_1$. The signal receiver $M_2$ is tuned for another frequency than $M_1$ and is not actuated by call signals. Both signal receivers are connected to the incoming branch and thus are not actuated by operating signals. In each of the two branches $a_1b_1$ and $a_2b_2$ are amplifiers FH for incoming and FV for departing signals and speech. In the differential transformer DT the two branches $a_1b_1$ and $a_2b_2$ are joined into a two-wire line $a$ and $b$ with the balance wire A and B. Outgoing signals are sent with the frequencies $f_1$ and $f_2$ with the aid of relays RF1 and RF2 and the transformer $T_r$ which, together with the balance BV corresponding to the inlet impedance of the amplifier FV is adjusted so that the A. C. from contacts 15 and 16 on relay RF1 with the frequency $f_1$ does not pass over the contacts 25 and 26 on relay RF2, and the A. C. with the frequency $f_2$ from the contacts 25 and 26 on relay RF2 does not pass over to contacts 15 and 16.

A call signal actuates the signal receiver $M_1$ so that the relay RF6 attracts its armature at the commencement of the signal and releases it on termination of the signal. The contact 62 is then closed and relay RF10 receives current from battery pole (in the following designated positive) over the winding of relay RF10, over contact 92 and contact 62 to battery negative. The relay RF10 attracts its armature and short-circuits contact 62 with contact 102 so that even a very short impulse from relay RF6 causes a complete attraction of relay RF10 armature. Relay RF9 attracts its armature when the contact 104 closes. The contact 92 is broken and the contact 93 closed, whereupon relay RF10 releases its armature somewhat slowly on account of a resistance in parallel with winding of relay RF10. The release time of relay RF10 increases the duration of a brief incoming impulse and relay RF10 repeats the incoming impulses to relay RF9 which, over contact 93, is self-held on account of contact 62 so that a long impulse from RF6 is repeated in its full length by relay RF9. When RF9 attracts its armature the contact 94 is closed and the following circuit is formed: positive pole, contact 94, contact 85, contact 131, contact 152, winding on relay RF15 to negative pole. Relay RF15 is a two-step relay which in the said circuit attracts its first step closing the contact 151. On termination of the call signal the relay RF6 releases its armature, contact 62 opens, relay RF9 falls and contact 94 opens. Hereby relay RF15 attracts its armature the second step closing the following circuit: positive pole, contacts 81 and 91, contact 151, both windings on relay RF15 in series, to negative pole. Relay RF15 actuates its contacts 152—158. Relay RF16 attracts its armature when contact 153 closes and its contacts become actuated.

To the left, Fig. 2 shows six connecting wires $a$, $b$, A, B, $c$ and $d$, which come from the multiples of the group selectors GV. When a group selector GV tests on a trunk line according to Fig. 2 this is done over the $c$-wire, break contact in cut-out key BK, contacts 155, 142 and 112, winding on RF1, contact 63, to negative and parallel with winding on RF1 over contact 122, resistance $r_2$, contacts 141, 154 and 63, negative. At the beginning of a call the test circuit in the contact 63 is broken. When relay RF10 attracts its armature relay RF11 receives current over contact 103 and attracts its armature, whereupon the test circuit is broken in contact 112. Relay RF11 is connected in parallel with an electrolytic condenser K2 and thus remains attracted for a time which is considerably longer than a calling impulse. When relay RF15 attracts its armature the test circuit in contacts 154 and 155 is broken, causing the line to be engaged for outgoing calls.

When the contact 157 closes, the call is marked in the group selector GV forming the following circuit; positive from contact 157, contact 26 in Fig. 3, winding on relay RG1, contacts 35 and 46, discharge tube GLS and resistance $m_s$ to negative pole on a battery with 180 v. tension, the positive pole of which is connected to positive and which in the following is designated by negative 180 v. The resistance $m_s$ is common to all group selectors GV and registers REG. Should only one group selector GV be calling, its discharge tube GLS burns. If several group selectors GV are calling simultaneously, the discharge tube having the lowest discharge potential will burn and short-circuit the other tubes. Experience has proved that two discharge tubes do not have a discharge potential so exactly alike that they can light up simultaneously in a test circuit such as the one described above, if the common resistance $m_s$ is sufficiently large. The arrow applied on the wire between the discharge tube GLS and the resistance $m_s$ indicates a multiplication to a number of discharge tubes GLS in the direction to which the arrow points. This designation is repeated on other multiplication points. When the discharge tube GLS burns, the relay RG1 attracts its armature and the contacts 11, 12 and 13 are closed. Over the contact 13 the call is marked to all the free registers REG over the following circuit: negative 180 volt, resistance $m_r$, contacts 13 and 20, discharge tube GLR in Fig. 4, winding on relay SR1, contact 15, break contact in the zero return device of selector RV2, break contact in the zero return device of selector RV3, contact in the home position of selector RV1, to positive. The resistance $m_r$ is common to all group selectors GV and the connection emanating from the contact 20 in Fig. 2 is multiplied on all line selectors RS pertaining to these group selectors. Now, all disengaged line finders RS are called simultaneously and the discharge tube GLR which has the lowest discharge potential, burns and the corresponding relay SR1 attracts its armature. Consequently, only one register can answer the call. The following circuit is then formed: positive over contact 11 in Fig. 3, contact 28, contact 111 in Fig. 4, winding on bar magnet STM1 to negative. The bar magnet STM1 attracts its armature. Here it has been assumed that the calling group selector is connected in the first decade in the register selectors RS.

The contact 140 closes and the relay SR2 attracts its armature. The contacts 120—123 close and form the following circuit: positive over contact 12 in Fig. 3, contact 29, contact 121 in Fig. 4, winding on bridge magnet BRM1 to negative. The bridge magnet BRM1 attracts its armature and the contact group I—VI corresponding to the bridge magnet BRM1 and the bar magnet STM1 is actuated. The following circuit is formed: positive over contact 153 in Fig. 2, winding on relay RG2 in Fig. 3, contacts 44 and 33 or 72, multiple contact V in Fig. 4, winding on relay RR1 to negative. The relays RG2 and RR1 attract their armatures. The relay RG2 in Fig. 3 breaks the circuit for the discharge tube GLS in contact 26 and the relay RG1 releases its armature. The circuit for the discharge tube in Fig. 4 is broken by the relay RR1 through the contact 15, whereby the register REG and its line finder RS is marked occupied. The relay RG2 in Fig. 3 breaks at contact 20 the call circuit for all other free registers, which previously had been barred by the tube GLR in the register taking the call.

The contacts 28 and 29 on relay RG2 break the circuits to the bar magnet STM1 and the bridge magnet BRM1. The bar magnet STM1 releases its armature while the bridge magnet BRM1 remains energized in a circuit over the contact 131, the contact 14 on relay RR1, one of the contacts 23 on relay RR2 or 64 on relay RR6, to positive. The relay SR2 releases its armature and the contacts 120—129 break.

The switching operation for a call from a trunk line is now terminated and the line has been connected to a disengaged register REG over its line selector RS. The call is marked in the line equipment according to Fig. 2 by the relays RF15 and RF16 attracting their armatures. In the group selector GV, the relay RG2 and in the register, the relay RR1 have attracted their armatures. The bridge magnet BRM1 in the line finder RS holds the contacts I—VI closed. At the same time as the marking of the call took place in the registers by the relay RG1 in Fig. 3 attracting its armature, the contact 14 in Fig. 3 closed and the charging of the electrolytic condenser K3 started over the resistance $r_4$. When the voltage rises in the electrolytic condenser K3 the power increases in the following circuit: positive over contact 14, resistances $r_4$ and $r_5$, winding on relay RG4 to negative. Normally the relay RG4 has no time to attract its armature before the relay RG2 attracts its armature and breaks the circuit for relay RG1, whereafter the contact 14 is opened again. However, should some fault exist or all the registers be engaged, the relay RG4 will attract its armature on account of the above circuit, whereby the contacts 46 and 44 open and the relay RG4 becomes self-held in the following circuit: positive over the contact 153 in Fig. 2, contacts 32, 43 and 42 in Fig. 3, winding on relay RG4 to negative. Hereby the switching operation stops without the common resistance $m_s$ being barred by the discharge tube GLS. The relay RG1 releases its armature, when the contact 46 opens.

Figure 3:
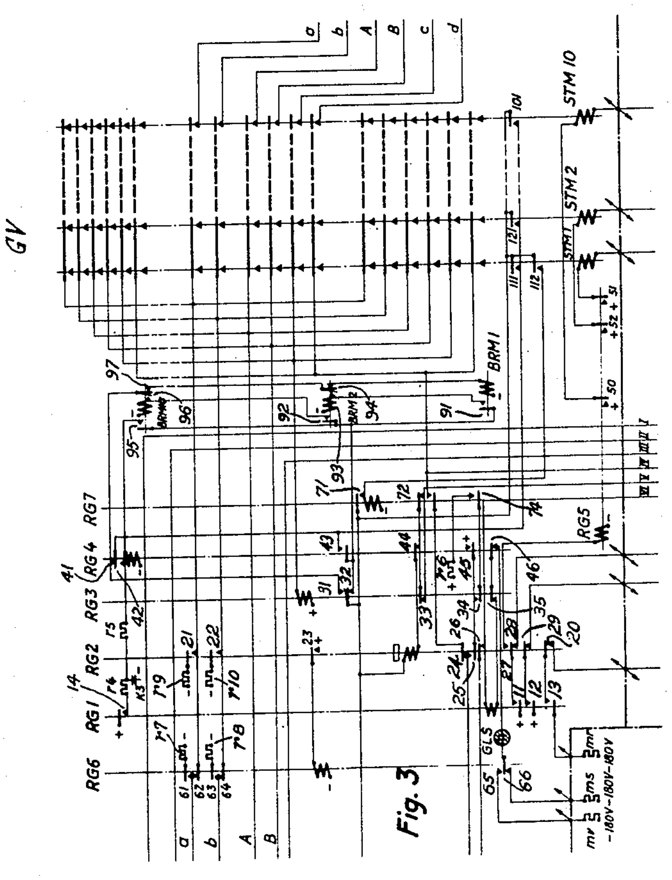
Figure 4:
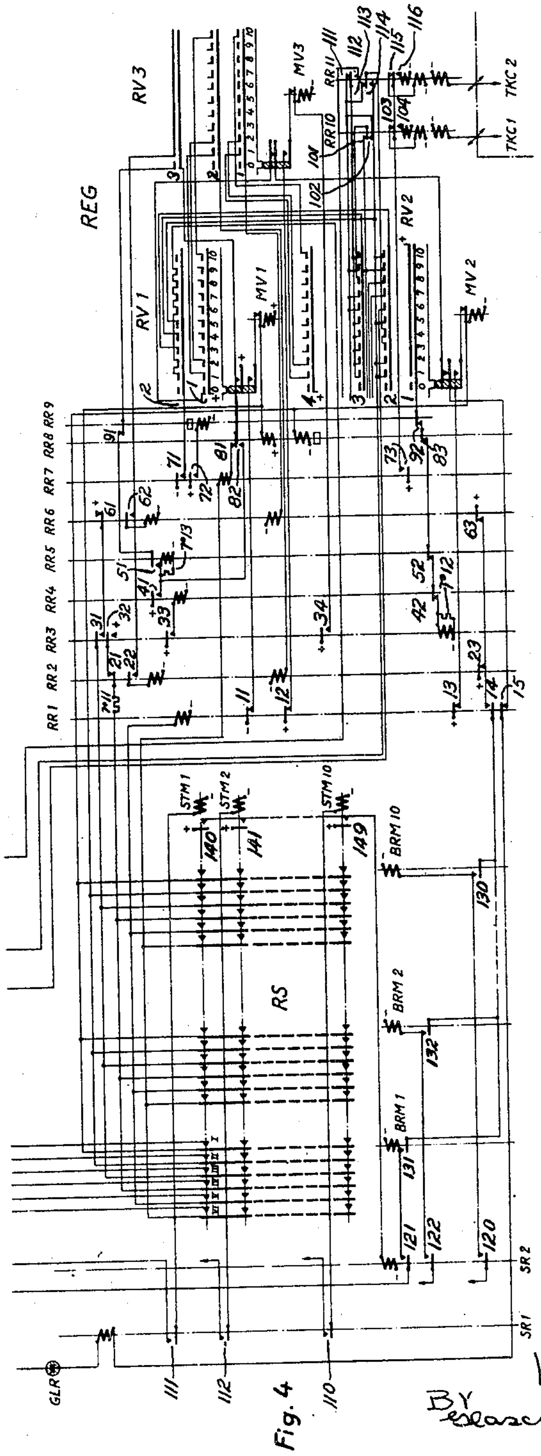

When the register has been connected to the group selector GV according to Fig. 3 and the relay RG2 has attracted its armature, the relay RG6 receives current and attracts its armature. The speaking wires $a$, $b$ break and make in the other direction over the contacts 61 and 63 and the resistances $r_7$ and $r_8$ and the resistances $r_9$ and $r_{10}$, forming the following parallel circuits: positive, winding on relay RF5 in Fig. 2, windings on choke coil D, rectifiers Re1 and Re2, speaking wires $a$ and $b$, resistances $r_7$ and $r_8$, negative. The rectifiers Re1 and Re2 are intended to reduce the attenuation and unbalance caused by the choke coil D on speech. The relay RF5 attracts its armature and actuates the contacts 51—57, whereby the balance wires A and B are cut and changed over so that the A-wire is connected to the relay RF3 and the B-wire to the contact III in the register selector RS. The balance side of the transformer DT closes over the resistances $r_0$ in Fig. 2, which is balancing the choke coil D and the resistances $r_7$ and $r_8$ in Fig. 3.

Hereafter impulses arrive from the trunk line on the wires $a_1$ and $b_1$ in Fig. 2. The impulses are received by the signal receivers $M_1$ and $M_2$ and the relays RF6 and RF7 follow the impulse series. Impulses with A. C. frequency $f_1$ are repeated by the relay RF6 over the following circuit: negative over the contact 61 in Fig. 2, multiple contact II in the line selectors RS in Fig. 4 (the connection passes Fig. 3), winding on magnet MV1 to register selector RV1 to positive. Impulses with A. C. frequency $f_2$ are repeated by the relay RF7 over the following circuit: positive over contact 71 in Fig. 2, multiple contact I in line finder RS in Fig. 4, winding on magnet MV2 to register selector RV2. Simultaneously, the relays RF8—RF11 in Fig. 2 operate but without influencing the switching operation since the contact 24 in Fig. 3 is broken.

Parallel to the magnets MV1 and MV2 in Fig. 4 lie the windings on the relay RR8, which is slow releasing. It attracts its armature on commencement of the impulse emission and holds it till the last impulse to the one of the magnets MV1 and MV2 which receives the longest impulse series. The register selectors RV1 and RV2 are advanced by the impulses and stop, RV1 in a position corresponding to the first digit in the transferred number and RV2 in a position corresponding to the second digit. When the register selector RV1 leaves its home position the following circuit is formed: positive, contact in selector RV1 zero return group, contact 82, winding on relay RR5 to negative. Relay RR5 attracts its armature, opens the contact 52 and becomes self-held over contacts 51 and 91 and contact in the home position of register selector RV3 contact strip 3. When the relay RR8 releases its armature the following circuit is formed: positive, contact in the register selector RV1 zero return group, contact 81, winding on relay RR7, contact VI in the line finder RS, winding on relay RG1 in Fig. 3, contacts 35 and 46, discharge tube GLS, the common resistance $m_v$, to negative 180v. The discharge tube GLS burns and relays RG1 in Fig. 3 and RR7 in Fig. 4 attract their armatures. Hereby the winding of relay RR9 receives current over contact 72 and attracts its armature, actuating the contact 92 and the self-holding circuit for the relay RR5 breaks in contact 91, so that the relay RR5 releases its armature. According to Fig. 3 the relay RG5 receives current over the contacts 11 and 27 and attracts its armature, making the contacts 50—59. Since only one discharge tube GLS at a time can burn, only one group selector GV at a time can have its relay RG5 energized. When the relay RR7 in Fig. 4 attracts its armature the following circuit is closed: negative through contact 71, contact in the register selector RV1, contact arc 2 (for instance position 3), contact in the register selector RV2 contact arc 2 or 3 (for instance contact arc 2 position 6), winding on one of the bar-magnets STM1—STM10 (for instance STM1) in Fig. 3, contact on the relay RG5 (for instance contact 51), to positive. The bar- magnet pointed out by the register selectors RV1 and RV2 (in the example STM1) attracts its armature. The following circuit is closed: positive through contact 153 in Fig. 2, one of the contacts 101—191 in Fig. 3 (in the example the contact 111), contacts 41, 97 and 94, winding on the bridge magnet BRM1, to negative. The bridge magnet BRM1 attracts its armature and closes the multiple contacts corresponding to the actuated bar-magnet (STM1 according to the example) in the first bridge. The contact 91 is closed and the following circuit formed: positive over contact 153 in Fig. 2, contact 32 in Fig. 3, contact 91, winding on bridge magnet BRM2 to negative. The bridge magnet BRM2 attracts its armature, breaks the circuit for the magnet BRM1 winding, is self-held through the contact 93 and connects current to the bridge magnet BRM3 winding through the contact 92. The switching operation is repeated till either a free line is found, whereby the relay RG3 attracts its armature, or the winding of the relay RG4 is energized through the contact 95 on the last bridge magnet STM10, whereby the relay RG4 attracts its armature, becomes self-held through the contacts 42 and 43 and breaks the switching operation through the contact 41. In the first-mentioned case the circuit is broken for the discharge tube GLS in the contact 35 and in the latter case in the contact 46. The relay RG1 in Fig. 3 and the relay RR7 in Fig. 4 release their armature.

The switching operation in the group selector GV according to Fig. 3 may be of three different kinds:

(1) If no disengaged junction line is found, the relay RG4 attracts its armature as above. Hereby the contact 44 and the relay RR1 in Fig. 4 release their armature, whereby the contact 14 opens and the bridge magnet BRM1 in the line selector RS releases its armature. The contacts I—VI in the line selector RS are broken and the register REG is released. During the release time of the relay RG2 which is slow-acting, in Fig. 3, an impulse is emitted in the following circuit: positive over contact 45, contact 25, contacts 156 and 95 in Fig. 2, winding on relay RF1, winding on relay RF2, contact 63 to negative. The relays RF1 and RF2 attract their armatures and a signal is emitted on the trunk line to the initial exchange of the connection. This signal indicates that the connection cannot be set up.

(2) If a free junction line is found on selection in the direction corresponding to the bar magnet STM1, the selection operation is interrupted at the contact 32 by the relay RG3 attracting its armature and the bridge magnet which has connected the free junction line is held in an already described circuit through the contact 31. When the bar magnet STM1 has attracted its armature, the relay RG7 receives current through its winding, attracts its armature and becomes self-held through the contact 71. The contacts 72, 73 and 74 are operated. Since the contacts 33 and 72 are opened, the relay RR1 in Fig. 4 is released and the register becomes free as under (1). During the release time of the relay RG2, the following circuit is closed according to Fig. 3: positive over resistance $r_6$, contacts 74, 34 and 25, contacts 156 and 95 in Fig. 2, winding on relay RF1, winding on relay RF2, contact 63 to negative. The relay RF1 attracts its armature, but relay RF2 is not actuated. A signal with A. C. frequency $f1$ is sent out on the wires $a_2b_2$ of the trunk line to the initial exchange of the call. The signal indicates that the local network corresponding to the trunk number has been reached and that the local number is to be sent from the initial exchange.

(3) If a free junction line is found on selection in any of the traffic routes corresponding to the bar magnets RG3 in Fig. 3, the relay RG3 in Fig. 3 attracts. Let it be assumed that testing takes place on a trunk line according to Fig. 2, the following circuit is closed: positive, winding on relay RG3, multiple contact in group selector GV, $c$-wire, break contact in the cut-out key BK in Fig. 2, contacts 155, 142 and 112, winding on relay RF1, contact 63 to negative and parallel with this circuit through the contact 122, the resistance $r2$, contacts 141, 154 and 63 to negative. The relays RG3 in Fig. 3 and RF2 in Fig. 2 attract their armatures. According to Fig. 2 the following circuit is closed: positive through contact 158, contact 132 or 144, contact 17, winding on relay RF12, which is slow acting, contacts 143 and 95, winding on relay RF1, winding on relay RF2, contact 63, to negative. In this circuit the relay RF2 armature is held until the relay RF12 has attracted its armature, while the relay RF2 is not actuated. Consequently, the relay RF12 is forced to accomplish the switching operation so that a call signal always will be followed by a disconnecting signal according to the description below even if the testing operation should be interrupted. When relaly RF12 attracts its armature, one of the parallel testing circuits in the contact 122 is broken, whereby the relay RF12 becomes self-held in series with the testing relay RG3 in Fig. 3, through the contact 123 in Fig. 2 and an auxiliary winding. At the same time the contact 126 is closed and the relay RF14 is energized through its proper winding, attracts its armature and is self-held through the contact 145 in series with the resistance $r3$. This causes break of the other of the parallel testing circuits in the contact 142 and the relay RF1 releases its armature. Thus, during the release time of the relays RF12 and RF14, a call signal has been emitted having the A. C. frequency $f1$ on the wires $a_2b_2$. Simultaneously with the contact 126 the contact 127 is closed and one winding on relay RF13 becomes energized. Relay RF13 attracts its armature and the electrolytic condenser K1 connected in parallel with its winding is charged through a protection resistance. This causes break of the contact 131 so that the relay RF15 cannot be actuated by backwardly directed signals from the line, a disconnecting signal is prepared through the contact 134. Moreover, the relay RF5 attracts its armature in the following circuits connected in parallel: positive, winding on relay RF5, winding on choke coil D, rectifiers Re1 and Re2, wires $a$ and $b$ (to the left in Fig. 2), contacts on the group selectors GV in Fig. 3, contacts 21, 22 respectively, resistances $r_9$, $r_{10}$ respectively, to negative. The contacts 51—57 in Fig. 2 are actuated.

When the relay RG3 in Fig. 3 attracted its armature, the hunting process in the contact 32 was interrupted and the bridge magnet which has connected the free junction line is held in a circuit over the contact 31. Contact 33 opens, but the relay RG2 circuit over the contact 72 is maintained until the register REG has remitted the received digits. When the setting operation in the group selector GV starts, relay RR7 in Fig. 4 attracts its armature according to above description. Hereby the contact 73 is closed, whereby the relays RR10 and RR11 become locked in the condition prevailing at the moment. The relays RR10 and RR11 receive current over the wires TKC1 and TKC2 from circuits corresponding to TK1 in Fig. 2. If a trunk line is free this is indicated by the following circuit: positive over the contact 161 in Fig. 2, contacts 113, 87 and 149, break contact in barring key BK, the wire TKC1 common for all trunk lines which pertain to the same traffic direction, windings on all relays RR10 in Fig. 4, connected in parallel, to positive. As long as some line in the traffic direction corresponding to the wire TKC1 is free, positive is thus connected to the wire TKC1 and the armature of the relay RR10 is attracted in all registers REG. If the contact 73 is connected during attraction of the relay RR10, the relay is held magnetized with current over the contact 104 over a supplementary winding. Should the relay RR10 have released its armature when the contact 73 closes, the relay is magnetized with current over the contact 103 by a supplementary winding which counteracts the make winding so that it cannot attract in the circuit over the wire TKC1. Since the last-mentioned supplementary winding, however, is not capable of actuating the relay, its armature maintains its released position. The relay RR11 operates in analogy with the relay RR10. The setting circuit to the group selector GV for the number combination 48 normally passes the contact 102 but should all lines in the traffic direction pointed out by the connection going out from the contact 102 be engaged, the relay RR10 releases its armature and the number combination 48 sets up the connection in the traffic direction. This implies that if all lines from the exchange 36 to the exchange 461 in Fig. 1 are engaged, the calls from exchange 36 to the exchanges 481—489 are conducted over the exchange 399. In the same manner the relay RR11 switches the number combinations 33 and 34 from the contact 114, which is connected to the bar magnet STM2 in Fig. 3 and which indicates the number combinations 50—59 and 30—32 and 35, to the contact 113, which is assumed to be connected for instance to the bar magnet STM6 and which indicates the number combinations 46, 47 and 49. At the same time the relay RR11 switches the number combinations 40—45 from the corresponding traffic direction which is pointed out by the connection emanating from the contact 112 to the traffic direction corresponding to the contact 111 and the number combinations 46, 47 and 49.

When the choice of traffic direction and line in this direction has been accomplished, the relay RR7 releases according to the above description and thus also the relay RR9, whose circuit is interrupted in the contact 72. The relay RR9 is slow-acting on release in order that the calling signal over the line selected by the group selector GV and the register connection to the farther end of said line may have time to follow before the commencement of impulse emission, according to description below. Hereafter the following circuit is formed: positive over the one of the contact positions 1–10 on the contact strip 1 in the register selector RV2, to which the register selector RV2 has been set, contacts 92, 83, 52 and 42, winding on relay RR3 to negative. Relay RR3 attracts its armature and actuates the contacts 31—34. The following circuits are closed:

(1) Positive over contact 61, contact 31, contact III in line finder RS, contact 56 on relay RF5 in Fig. 2 (the call passes Fig. 3), wire B, multiple contact in group selector GV in Fig. 3, wire B to the trunk line engaged by the group selector GV which line is presumed to be made according to Fig. 2, contact 56 in its relay RF5, contact 121, winding on relay RF2, contact 63 to negative. The relay RF2 attracts its armature and connects A. C. by the frequency $f2$ to the line;

(2) Positive over contact 32 in Fig. 4, contact 21, resistance $r11$, contact IV in line finder RS, multiple contact in group selector GV in Fig. 3, wire $d$ to the trunk line engaged by the group selector GV which line is presumed to be made according to Fig. 2, contacts 124, 133 and 95, winding on relay RF1, winding on relay RF2, contact 63 to negative. The relay RF1 attracts its armature, but the relay RF2 is not actuated by this circuit on account of the resistance $r11$, and A. C. is sent out on the line by the frequency $f1$;

(3) Positive over contact 34, winding on magnet MV3, to negative. Register selector RV3 attracts its armature.

(4) Positive over contact 33, winding on relay RR4, to negative. Relay RR4 attracts its armature and breaks at contact 42 the circuit for relay RR3 winding. The relay RR3 is however somewhat slow-acting on release on account of the resistance $r12$ which is connected in parallel to the winding of the relay.

On relay RR4 attracting its armature the winding of relay RR5 is energized over the contact 41 and the relay RR5 attracts its armature, opening the contact 52. When the relay RR3 releases its armature the above described circuits (1)-(4) are opened. The A. C. impulses with the frequencies $f1$ and $f2$ through the line engaged by the group selector GV are terminated, the register selector RV3 moves its wiper bridge to position 1 and the relay RR4 releases its armature. The circuit for relay RR5 winding is opened by the contact 41, but the relay RR5 has a somewhat delayed action on release on account of the resistance $r13$, which is connected in parallel to the relay winding, consequently a brief pause occurs before the contact 52 is closed and the next impulse can commence with the aid of relay RR3. The register selector RV3 steps forward one step at each impulse from the contact 34. When the selector RV3 reaches a position corresponding to the setting of one of the register selectors RV1 and RV2, one of the following circuits is closed:

(1) When the position corresponding to the setting of the register selector RV1 has been reached: positive over contact on RV1 contact segment 1 (for inst. position 2), corresponding contact on RV3 contact segment 2 (position 2), winding on relay RR2, to negative. Relay RR2 attracts its armature and becomes self-held by means of the contact 22 in the following circuit: positive over contact in the register selector RV1 zero return group, contact segment 3 positions 1–10 on selector RV3, contact 22, winding on relay RR2, to negative. The contact 21 opens and the impulse emission with A. C. frequency $f1$ according to above description is interrupted. The contact 23 opens.

(2) When the position corresponding to the setting of the register selector RV2 is reached: positive over contact on RV2 contact segment 4 (for instance position 10), corresponding contact on RV3 contact segment 1 (position 10), winding on relay RR6, negative. The relay RR6 attracts its armature and becomes self-held by means of the contact 62 and a supplementary winding. The contact 61 is opened and the impulse emission with the A. C. frequency $f_2$ is interrupted. The contact 63 is opened.

When both the contact 23 and the contact 63 have opened, the current through the bridge magnet BRM1 winding is interrupted and BRM1 releases its armature. The contacts I—VI are then opened in the line finder RS and the register REG is released. The relay RR1 releases its armature and the contacts 11—13 and 15 are closed. Over the contact 11, contact in the register selector RV1 zero return group and the magnet MV1 self-breaking contact, a circuit is closed for the magnet MV1 winding causing the selector RV1 to step round to its initial position (position 0). In the same manner the selectors RV2 and RV3 are restored to their home positions on closing of the contacts 13 and 12.

When two lines are interconnected over multiple contacts in the group selector GV, the wires A are connected together. If both lines are identical, for instance according to Fig. 2, no change takes place at the connection of the A-wires. However, should a trunk line according to Fig. 2 be connected with a junction line which lacks amplifier, the following circuit is formed: positive on A-wire in the line lacking amplifier, multiple contact in group selector GV in Fig. 3, A-wire, contact 53 in Fig. 2, winding on relay RF3, to negative. The devices on the line lacking amplifier may tally perfectly with the devices RF5, D, Re1, and Re2 in Fig. 2, except that the contact 53 is connected over a resistance to positive instead of over a winding on the relay RF3 to negative, which resistance advantageously may be adjusted so as to serve also for the regulation of the amplification at the connection of two lines which lack individual amplifiers, over a cord repeater. In the trunk line according to Fig. 2 the relay RF3 attracts its armature on account of the above-mentioned circuit and becomes self-held in the following circuit: positive, winding on relay RF3, contact 31, contact 162 to negative. If the trunk line according to Fig. 2 is engaged by a group selector GV, Fig. 3, the contact 162 in said circuit is not closed, but instead the contact 135 is closed. When the register REG is released, the relay RG2 in Fig. 3 releases its armature and the contacts 21—23 open. The relay RG6 releases its armature and the contacts 61 and 63 open and 62 and 64 close. The relay RF5 in Fig. 2 releases its armature and the contact 57 closes, forming the following circuit; positive over contact 57, winding on relay RF4, contact 31, one of the contacts 135 and 162, negative. The relay RF4 attracts its armature and disconnects by means of the contacts 41—46 the line prolongation LF. If the trunk line in Fig. 2 has been connected with another trunk line having individual amplifiers, the relay RG7 in Fig. 3 has not attracted its armature, wherefore signals between the lines are not repeated by the relays RF6—RF11 but pass on the speaking connection. If the trunk connection in Fig. 2 has been connected with a line without individual amplifier, the signals are repeated as follows:

(1) Signals with A. C. frequency $f1$ actuate the relays RF6—RF11 in conformity with the switching operation by calls and the following circuit is now formed: positive over contact 94, resistance $r_1$, contact 172, winding on relay RF17, contact 156, contacts 24 and 73 in Fig. 3, multiple contact in group selector GV, wire $d$, to negative over impulse receiving devices in the equipment engaged by group selector GV.

(2) Signals with A. C. frequency $f2$ actuate exclusively the relay RF7, otherwise they remain without effect.

(3) Signals with both the A. C. frequencies $f1$ and $f2$ actuate both the relays RF6 and RF7, closing the following circuit: positive, winding on relay RF8, contact 72, negative. The relay RF8 attracts its armature and the contacts 81—88 are operated. The contact 82 connects an operating winding on relay RR8 connected in parallel with, but counteracting, the supplementary winding which, when the contact 72 opens, will cooperate with that winding so that relay RR8 becomes slow releasing and quick operating. The contact 84 closes the following circuit:

Positive over contact 94, contacts 84 and 172, winding on relay RF17, contact 156, contacts 24 and 73 in Fig. 3, multiple contact in group selector GV, $d$-wire to negative over a signal receiving relay for the line which the group selector GV has selected. If this line were a trunk line made according to Fig. 2 and the signal had been emitted from a line lacking amplifier, the last-mentioned circuit would be terminated over the $d$-wire (to the left in Fig. 2), the contacts 124, 133, 95, winding on relay RF1, winding on relay RF2, contact 63, to negative. Hereby both the relays RF1 and RF2 would attract their armatures and a signal with the two A. C. frequencies $f1$ and $f2$ would be sent out on the trunk line.

As long as the switching operation for the setting of the connection is progressing, it is presumed that the speaking devices of the subscribers are not connected to the connection and the voice frequency signals cannot be disturbed by speech. When the connection has been established it is presumed that the condition at the called subscriber line is signalled to the home exchange by means of buzzer signals which cannot actuate the signal receivers M1 and M2 in Fig. 2, moreover, that all signals required for terminating the switching operation, when the above described backward signal, which at the disconnection of the register REG, was sent out to the home exchange of the connection as a sign that the local number is to be sent out, contain only the frequency $f1$.

Here it is presumed that the switching operation is so arranged that the called local exchange, when the connection reaches the called subscriber line, emits a signal to the home exchange of the connection, which signal causes connection of the speaking devices of the calling subscriber to the connection. The home exchange of the connection now answers with a signal which is repeated over trunk lines with amplifiers by means of the two frequencies $f1$ and $f2$ and which partly marks that the connection is interurban, partly switches the equipments in Fig. 2 so that only signals containing both frequencies $f1$ and $f2$ and exceeding a predetermined duration may be repeated by the signal repeaters. In the same manner a similar signal is sent from the called local exchange to the home exchange of the connection when the called subscriber is connected, that is to say when he removes his handset.

As is seen from the above description, on no occasion, in the above switching operation, is any signal having the frequencies $f1$ and $f2$ sent out, which is repeated in the last described circuit. If such a signal arrives it means that a speaking device has been connected to the communication channel. A brief signal in the direction of the call with the two frequencies $f1$ and $f2$ closes the following circuit, already mentioned: positive, contacts 94, 84 and 172, winding on relay RF17, contact 156, contacts 24 and 73 in Fig. 3, multiple contact in group selector GV, wire $d$ to an impulse receiving relay in the line engaged by the group selector GV. Hereby the two-step relay RF17 attracts its armature the first step and the contact 174 is closed, forming the following circuit: positive over contact 83, contacts 173 and 174, resistance r11, contact 162, negative. The contact 83 holds short-circuited a supplementary winding connected to this circuit on the relay RF17. When the signal is terminated and the relay RF8 releases its armature, this connection ceases and the relay RF17 attracts its armature the second step on account of a current through the said supplementary winding. The contacts 172 and 173 are opened.

A brief signal from the called local exchange to the home exchange of the connection, with both frequencies f1 and f2, closes this circuit: positive over contact 94, contacts 84 and 172, winding on relay RF17, contacts 133 and 124, d-wire to the left in Fig. 2, to negative over the impulse receiving relays in the device which has engaged the trunk line. The relay RF17 is energized in conformity with the above description.

When the two subscribers have been connected, the armatures of relays RF17 are attracted in the (normally two) line equipments in Fig. 2 which commence, and terminate, the series of trunk lines connected in series, with amplifiers and voice frequency receivers forming a part of the telephone connection. Signals which occur hereafter and contain only one of the frequencies f1 and f2 cannot be repeated, as the contact 172 is opened. Signals with both frequencies actuate the two relays RF6 and RF7 closing the following circuit: positive over contact 71, contact 171, winding on relay RF18, contact 61, negative. The relay RF18 which is slow both releasing and operating, attracts its armature if the signal is long enough. The armature of relay RF18 now remains attracted awhile upon commencement of the signal during which time signals with only the frequency f1 may be commenced and repeated, since the circuit which was interrupted by the contact 172 now is closed over the contact 182. The relay R18 holds its armature as long as the signaling continues, with the aid of the self-holding contact 181.

If a long signal with both frequencies f1 and f2 arrives, the relay RF11 releases its armature during the signal. Hereby, all contacts 81, 91, 101 and 111 will remain open simultaneously, breaking the holding circuit of relay RF15 and causing the relay RF15 to release its armature. This implies that the connection is disconnected. When the signal ceases the following circuit is closed: positive over contact 161, contacts 113 and 86, winding on relay RF2, contact 63, negative. This circuit is closed only during the release time of relay RF8. During this time a signal with the A. C. frequency $f_2$ is sent out on the trunk line. The signal has the purpose of verifying that the line and its equipment are intact, disengaged and at operating efficiency and it actuates the equipment at the other end of the line, according to the description below. When the test circuit over the c-wire to the left in Fig. 2 is interrupted, the relay RF12 releases its armature closing the following circuit: positive over the contact 125, the contacts 133 and 95, winding on relay RF1, winding on relay RF2, contact 63 to negative. This circuit is closed only during the release time of the relay RF13. The circuit for the relay RF13 is interrupted in the contact 127 and the relay holds its armature until the electrolytic condenser K1 has been discharged. The relay RF14 remains magnetized with current over the contact 145 and the resistance r3. When the disconnection signal is terminated the above-mentioned test signal arrives from the line indicating that the line and its equipment are intact, free and at operating efficiency. The relays RF7—RF11 attract and the following circuit is closed: positive over the contact 158, contacts 132, 18, 88 and 114, winding on relay RF14, negative. The winding of relay RF14 making part of this circuit counteracts the other winding of relay RF14 and leaves a considerably stronger magnetic field than this one, causing the relay RF14 to release its armature and to attract it again when the magnetic field in the relay has changed direction. The test signal is not of sufficient duration to give the relay RF11 time to release its armature during the signal. At the end of the signal the relays RF1—RF9 release their armatures. The relay RF14 releases its armature because the magnetic field changes direction when the contact 88 is opened. Hereafter also the relay RF11 releases its armature, and the line is free for a new call. If the test signal from the trunk line does not arrive, the relay RF14 armature remains attracted and the line is marked occupied by the contacts 141 and 142 being broken. The following circuit is closed: negative over contact 163, contact 148, winding on relay RF13, contacts 128 and 115, to an impulse emitting device which connects positive to the wire imp. at equal intervals and during a time corresponding to the time of a clearing signal. Every time that positive is connected to the wire imp. the relay RF13 attracts its armature and a clearing signal is emitted. This operation goes on until a test impulse arrives releasing the relay RF13 armature, or until a call impulse arrives from the line causing the relay RF11 to attract its armature and the contact 115 to open, whereupon the relays RF15 and RF16 attract their armatures and the contact 163 opens.

I claim:

1. In an automatic telephone system, two exchanges, a trunk line interconnecting said two exchanges, a register in one of said two exchanges set in accordance with at least two digits in a telephone number, means connecting said register to said trunk line, means for sending at least two series of impulses simultaneously over said trunk line under control of said register, the number of impulses in each series corresponding to a digit in said telephone number, said impulses being transmitted over said trunk line to the other of said two exchanges by an alternating current source one for each series of impulses, said alternating current sources having all different frequencies, each frequency representing the place in said telephone number for the digit corresponding to the number of impulses transmitted, separate impulse receiving devices in said other of the two exchanges for each of said alternating current sources actuated by said impulses and setting each a separate recording device in a register in said other of the two exchanges.

2. In a multi-exchange telephone system, a tandem exchange having a number in the system, incoming and outgoing trunk lines connected to said tandem exchange, a register, means for connecting an incoming trunk line to said register, means for setting the register by a series of A. C. frequency impulses simultaneously transmitted over the incoming trunk line in accordance with at least two digits in a number representing a called exchange, selectors controlled by said register connecting an outgoing trunk line to the register, means in the register actuated if the number registered does not correspond to the number of said tandem exchange for transmitting simultaneously at least two series of A. C. frequency impulses corresponding to digits registered in the register to said outgoing trunk line, the number of impulses representing a digit and the frequency representing the place of the digit in relation to the other simultaneously transmitted digits, means for disconnecting the register and connecting said incoming trunk line to said outgoing trunk line.

KARL AXEL LUNDKVIST.

REFERENCES CITED

The following references are of record in the file of this patent:

UNITED STATES PATENTS

| Number | Name | Date |
|---|---|---|
| 1,901,156 | Gillings | Mar. 14, 1933 |
| 1,942,651 | Kessler | Jan. 9, 1934 |
| 2,006,438 | Carpenter | July 2, 1935 |
| 2,201,296 | Lundstrom | May 21, 1940 |
| 2,206,538 | Rhodes | July 2, 1940 |
| 2,227,488 | Collis | Jan. 7, 1941 |
| 2,237,906 | King | Apr. 8, 1941 |
| 2,244,500 | Nyquist | June 3, 1941 |